(12) United States Patent  (10) Patent No.: US 8,597,858 B2
Fly et al.  (45) Date of Patent: Dec. 3, 2013

(54) ELECTROFORMED BIPOLAR PLATES FOR FUEL CELLS

(75) Inventors: Gerald W. Fly, Geneseo, NY (US); John P. Healy, Pittsford, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 619 days.

(21) Appl. No.: 12/765,049

(22) Filed: Apr. 22, 2010

(65) Prior Publication Data

US 2011/0262829 A1  Oct. 27, 2011

(51) Int. Cl.
*H01M 8/00* (2006.01)
*H01M 4/64* (2006.01)
*B05D 5/12* (2006.01)

(52) U.S. Cl.
USPC ........... 429/535; 429/518; 264/166; 264/250; 264/317; 156/155; 427/115

(58) Field of Classification Search
USPC ........... 429/535, 518; 427/115; 264/166, 250, 264/317; 156/155
See application file for complete search history.

(56) References Cited

U.S. PATENT DOCUMENTS

| | | | |
|---|---|---|---|
| 4,098,652 A * | 7/1978 | Koenig | 205/67 |
| 4,415,403 A * | 11/1983 | Bakewell | 216/27 |
| 4,461,678 A * | 7/1984 | Matthews et al. | 205/50 |
| 5,776,624 A | 7/1998 | Neutzler | |
| 6,642,941 B1 | 11/2003 | Kurata et al. | |
| 6,816,042 B1 * | 11/2004 | Noyes et al. | 333/248 |
| 6,887,610 B2 | 5/2005 | Elhamid et al. | |
| 7,009,136 B2 | 3/2006 | Schlag | |
| 7,445,647 B1 | 11/2008 | Davis et al. | |
| 2003/0180598 A1 * | 9/2003 | Fischer et al. | 429/34 |
| 2004/0234835 A1 * | 11/2004 | Strobel et al. | 429/35 |
| 2006/0046130 A1 * | 3/2006 | Lai | 429/38 |
| 2007/0275288 A1 | 11/2007 | Goebel et al. | |
| 2008/0292916 A1 * | 11/2008 | Newman et al. | 429/12 |

FOREIGN PATENT DOCUMENTS

| | | |
|---|---|---|
| CN | 101240435 A | 8/2008 |
| CN | 101312249 A | 11/2008 |

* cited by examiner

*Primary Examiner* — Milton I Cano
*Assistant Examiner* — Jeremiah Smith
(74) *Attorney, Agent, or Firm* — Fraser Clemens Martin & Miller LLC; J. Douglas Miller (57) ABSTRACT

A bipolar plate assembly for a fuel cell is provided. The bipolar plate assembly includes a first electroformed unipolar plate disposed adjacent a second electroformed unipolar plate. The first and second unipolar plates are bonded by a plurality of localized electrically and thermally conductive plugs by electroplated material deposited within apertures formed in the substrates onto which the unipolar plates are electroformed. A method for forming the bipolar plate assembly is also described.

3 Claims, 5 Drawing Sheets

ELECTROFORMED BIPOLAR PLATES FOR FUEL CELLS

FIELD OF THE INVENTION

The present disclosure relates to fuel cell stacks and, more particularly, to a bipolar plate assembly and methods for preparing bipolar plates for fuel cell stacks.

BACKGROUND OF THE INVENTION

Fuel cells can be used as a power source in many applications. For example, fuel cells have been proposed for use in automobiles as a replacement for internal combustion engines. In proton exchange membrane (PEM) type fuel cells, a reactant such as hydrogen is supplied as a fuel to an anode of the fuel cell, and a reactant such as oxygen or air is supplied as an oxidant to the cathode of the fuel cell. The PEM fuel cell includes a membrane electrode assembly (MEA) having a proton transmissive, non-electrically conductive, proton exchange membrane. The proton exchange membrane has an anode catalyst on one face and a cathode catalyst on the opposite face. The MEA is often disposed between "anode" and "cathode" diffusion media or diffusion layers that are formed from a resilient, conductive, and gas permeable material such as carbon fabric or paper. The diffusion media serve as the primary current collectors for the anode and cathode as well as providing mechanical support for the MEA and facilitating a delivery of the reactants.

In a fuel cell stack, a plurality of fuel cells is aligned in electrical series, while being separated by gas impermeable, electrically conductive bipolar plates. Each MEA is typically sandwiched between a pair of the electrically conductive plates that serve as secondary current collectors for collecting the current from the primary current collectors. The plates conduct current between adjacent cells internally of the fuel cell stack in the case of bipolar plates and conduct current externally of the stack in the case of unipolar plates at the ends of the stack.

The bipolar plates typically include two thin, facing conductive sheets. One of the sheets defines a flow path on one outer surface thereof for delivery of the fuel to the anode of the MEA. An outer surface of the other sheet defines a flow path for the oxidant for delivery to the cathode side of the MEA. When the sheets are joined, a flow path for a dielectric cooling fluid is defined. The plates are typically produced from a formable metal that provides suitable strength, electrical conductivity, and corrosion resistance, such as 316 alloy stainless steel, for example.

The bipolar plates have a complex array of grooves or channels that form flow fields for distributing the reactants over the surfaces of the respective anodes and cathodes. Tunnels are also internally formed in the bipolar plate and distribute appropriate coolant throughout the fuel cell stack, in order to maintain a desired temperature.

The typical bipolar plate is a joined assembly constructed from two separate unipolar plates. Each unipolar plate has an exterior surface having flow channels for the gaseous reactants and an interior surface with the coolant channels. Plates are known to be formed from a variety of materials, including, for example, a metal, a metal alloy, or a composite material. The metals, metal alloys, and composite materials must have sufficient durability and rigidity to function as sheets in the bipolar plate assembly, as well as to withstand clamping forces when assembled into a fuel cell stack without collapsing, It is known to form the plates using various processes such as, for example, machining, molding, cutting, carving, stamping, or photo-etching. In each known method of forming the plates, a substrate material, typically a metal or composite sheet, is required. It is possible to achieve a desired minimal thickness of the substrate, but at a tradeoff to cost and to undesirable material properties. For example, as a composite sheet is molded to a thinner dimension, it becomes more brittle and harder to work. Additionally, a thinner composite sheet is often less desirable because high carbon content may cause a thinner sheet to become porous. Similarly, as a metal sheet is thinned in multiple steps by drawing or rolling the sheet, it also becomes brittle or work hardened after each step, and requires annealing prior to further working. Thus, a higher manufacturing cost is associated with a thinner substrate material. Also, more care is required to form the complex surface features of the plates, such as the flow field pattern, from a thinner metal substrate material to avoid localized areas of high stress and the resulting cracks or tears in the plates due to thinner material. A thinner metal substrate also limits the depth of any flow channel due to metal stretch limitations. As a result, metal sheet plates are optimally formed having a thickness of about 3 to 6 mils (0.003 to 0.006 inches, or approximately 0.075 to 0.15 millimeters thick). It is understood, however, that thicker metal plates may be employed thicker in order to reduce cost and to improve workability of the plate material.

Additionally, conventional processes of forming the plates from the metal sheet material result in nearly half of the material being discarded as scrap. Some of the scrap is generated as apertures are punched in the non-active portion of the plates to create flow areas and manifolds for delivery and exhaust of reactants and coolant when a plurality of bipolar plates is aligned in the fuel cell stack. A larger portion of the scrap results from a clamping area that is required about the perimeter of the sheet material during the processes that form plates from the sheet material, which is then trimmed or cut off after processing.

Finally, in order to conduct electrical current between the anodes and cathodes of adjacent fuel cells in the fuel cell stack, the paired unipolar plates forming each bipolar plate assembly are mechanically and electrically joined. A variety of bipolar plate assemblies and methods for preparing bipolar plate assemblies are known in the art. For example, it is reported by Neutzler in U.S. Pat. No. 5,776,624, incorporated herein by referenced in its entirety, that a bipolar plate including corrosion-resistant metal sheets may be brazed together to provide a passage between the sheets through which a dielectric coolant flows. Further, U.S. Pat. No. 6,887,610 to Abd Elhamid, et al., incorporated herein by reference in its entirety, discloses a bipolar plate assembly without welding or brazing that includes an electrically conductive layer deposited over the coolant channels and lands and a fluid seal disposed between the inside facing surface about a perimeter of the coolant channels. Also, U.S. Pat. No. 6,942,941 to Blunk et al., incorporated herein by reference in its entirety, recites a bipolar plate having a first and second surface that are coated with an electrically conductive primer coating and joined to one another by an electrically conductive adhesive. Schlag in U.S. Pat. No. 7,009,136, incorporated herein by reference in its entirety, describes a method of fabrication adapted to weld bipolar plates together using a partial vacuum that holds paired unipolar plates together during the welding process. Commonly owned U.S. Pat. Appl. Pub. No. 2008/0292916, incorporated by reference herein in its entirety, discloses a bipolar plate assembly that includes a first unipolar plate disposed adjacent a second unipolar plate, where the first and second unipolar plates are bonded together by a plurality of localized electrically conductive nodes. The bonds may be formed as a weld, a solder joint, a braze joint, and an adhesive.

There is a continuing need for a cost-effective bipolar plate assembly having an efficient and robust structure that provides an optimized electrical contact between the plates of the assembly while minimizing material usage and waste and maximizing the structural integrity of the plates. A method for rapidly producing the bipolar plate assembly applicable to optimized flowfield designs is also desired.

SUMMARY OF THE INVENTION

In concordance with the instant disclosure, a cost-effective bipolar plate assembly having an efficient and robust structure that provides an optimized electrical contact between the plates of the assembly while minimizing material usage and waste and maximizing the structural integrity of the plate is surprisingly discovered.

The bipolar plate assembly includes a first electroformed unipolar plate disposed adjacent a second electroformed unipolar plate. The first and second unipolar plates are bonded by a plurality of localized electrically conductive plugs by electroplated material deposited within apertures formed in the substrate onto which the unipolar plates are formed.

In another embodiment, a method for preparing the bipolar plate assembly is provided. The method includes providing a substrate having a predetermined external surface pattern, and at least one aperture formed therethrough; plating the substrate to a predetermined thickness on the surface pattern to form a fuel cell bipolar plate, wherein the at least one aperture is filled by the metal plating process to provide thermal and electrical conductivity between each plate of the bipolar plate assembly. The substrate may be removed after the metal plating step.

In another embodiment, a method for preparing the bipolar plate assembly for a fuel cell includes the steps of: providing a first and a second polymer substrate, each having predetermined surface patterns, at least one of the first and second polymer substrates includes at least one aperture formed therethrough; placing the first plated polymer sheet adjacent the second plated polymer sheet; and applying a predetermined thickness of a plating material on the first and second plated polymer sheets, wherein the at least one aperture is filled by the metal plating process to selectively bond the first and second plated polymer sheets together to provide thermal and electrical conductivity between each plate of the bipolar plate assembly.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
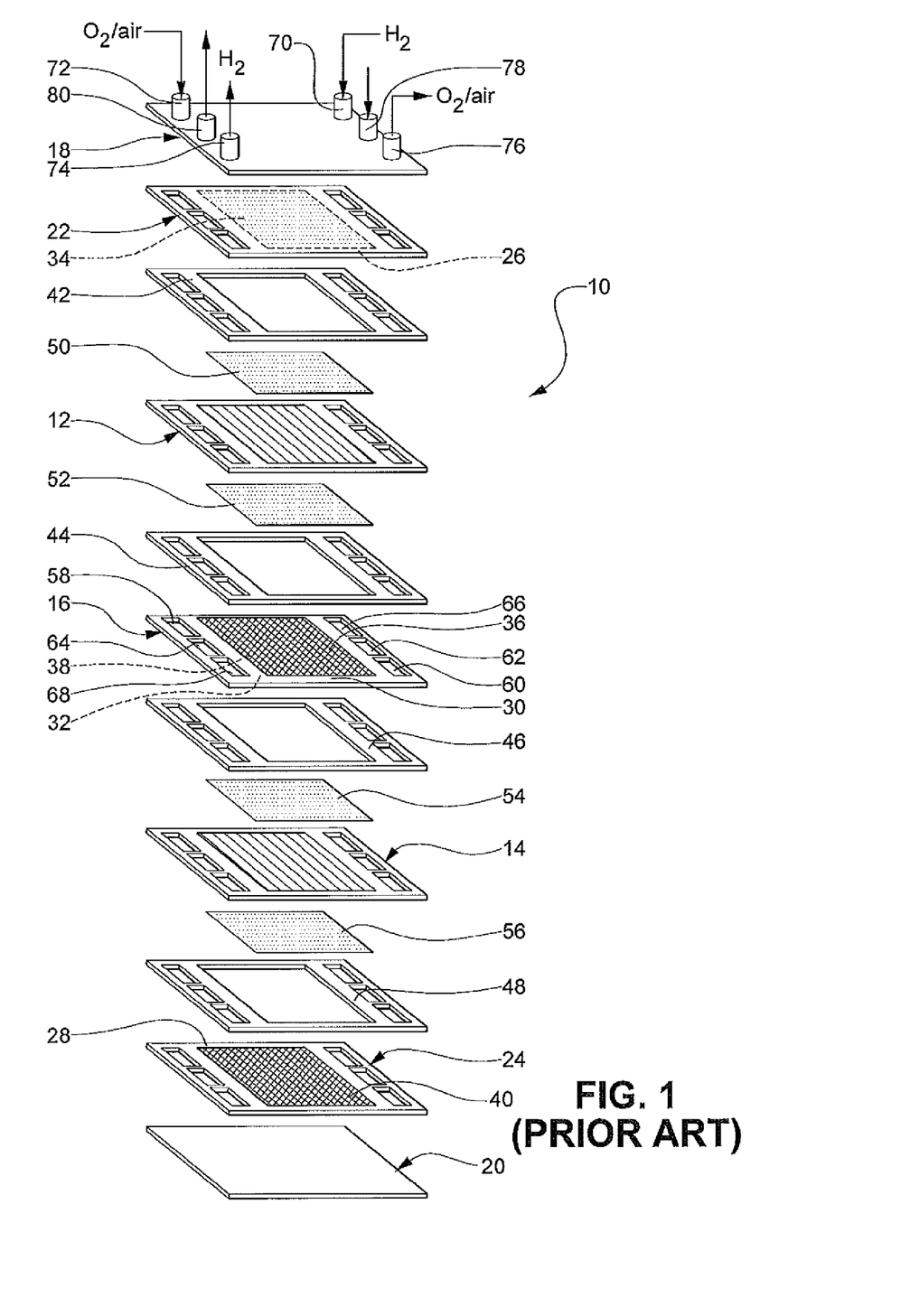
FIG. 1 is a schematic exploded perspective view of a PEM fuel cell stack as is known in the art.

FIG. 1 illustrates a PEM fuel cell stack 10 according to the prior art. For simplicity, only a two-cell stack (i.e. one bipolar plate) is illustrated and described in FIG. 1, it being understood that a typical fuel cell stack will have many more such cells and bipolar plates. The fuel cell stack 10 includes a pair of membrane electrode assemblies (MEAs) 12, 14 separated by an electrically conductive bipolar plate 16. The MEAs 12, 14 and the bipolar plate 16 are stacked between a pair of clamping plates 18, 20 and a pair of unipolar end plates 22, 24. The clamping plates 18, 20 are electrically insulated from the end plates 22, 24 by a gasket or a dielectric coating (not shown). Respective working faces 26, 28 of each of the unipolar end plates 22, 24, as well as the working faces 30, 32 of the bipolar plate 16, respectively include a plurality of grooves or channels 34, 40, 36, 38 adapted to facilitate the flow of a fuel such as hydrogen and an oxidant such as oxygen therethrough. Nonconductive gaskets 42, 44, 46, 48 provide seals and an electrical insulation between the components of the fuel cell stack 10. Gas-permeable diffusion media 50, 52, 54, 56 such as carbon or graphite diffusion papers substantially abut each of an anode face and a cathode face of the MEAs 12, 14. The end plates 22, 24 are disposed adjacent the diffusion media 50, 56 respectively. The bipolar plate 16 is disposed adjacent the diffusion media 52 on the anode face of the MEA 12 and adjacent the diffusion media 54 on the cathode face of the MEA 14.

As shown, each of the MEAs 12, 14, the bipolar plate 16, the end plates 22, 24, and the gaskets 42, 44, 46, 48 include a cathode supply aperture 58, a cathode exhaust aperture 60, a coolant supply aperture 62, a coolant exhaust aperture 64, an anode supply aperture 66, and an anode exhaust aperture 68, A cathode supply manifold is formed by the alignment of adjacent cathode supply apertures 58 formed in the MEAs 12, 14, the bipolar plate 16, the end plates 22, 24, and the gaskets 42, 44, 46, 48. A cathode exhaust manifold is formed by the alignment of adjacent cathode exhaust apertures 60 formed in the MEAs 12, 14, the bipolar plate 16, the end plates 22, 24, and the gaskets 42, 44, 46, 48. A coolant supply manifold is formed by the alignment of adjacent coolant supply apertures 62 formed in the MEAs 12, 14, the bipolar plate 16, the end plates 22, 24, and the gaskets 42, 44, 46, 48. A coolant exhaust manifold is formed by the alignment of adjacent coolant exhaust apertures 64 formed in the MEAs 12, 14, the bipolar plate 16, the end plates 22, 24, and the gaskets 42, 44, 46, 48. An anode supply manifold is formed by the alignment of adjacent anode supply apertures 66 formed in the MEAs 12, 14, the bipolar plate 16, the end plates 22, 24, and the gaskets 42, 44, 46, 48. An anode exhaust manifold is formed by the alignment of adjacent anode exhaust apertures 68 formed in the MEAs 12, 14, the bipolar plate 16, the end plates 22, 24, and the gaskets 42, 44, 46, 48.

A hydrogen gas is supplied to the fuel cell stack 10 through the anode supply manifold via an anode inlet conduit 70. An oxidant gas is supplied to the fuel cell stack 10 through the cathode supply manifold of the fuel cell stack 10 via a cathode inlet conduit 72. An anode outlet conduit 74 and a cathode outlet conduit 76 are provided for the anode exhaust manifold and the cathode exhaust manifold, respectively. A coolant inlet conduit 78 and a coolant outlet conduit 80 are in fluid communication with the coolant supply manifold and the coolant exhaust manifold to provide a flow of a liquid coolant therethrough. It is understood that the configurations of the various inlets 70, 72, 78 and outlets 74, 76, 80 in FIG. 1 are for the purpose of illustration, and other configurations may be chosen as desired.

Figure 2:
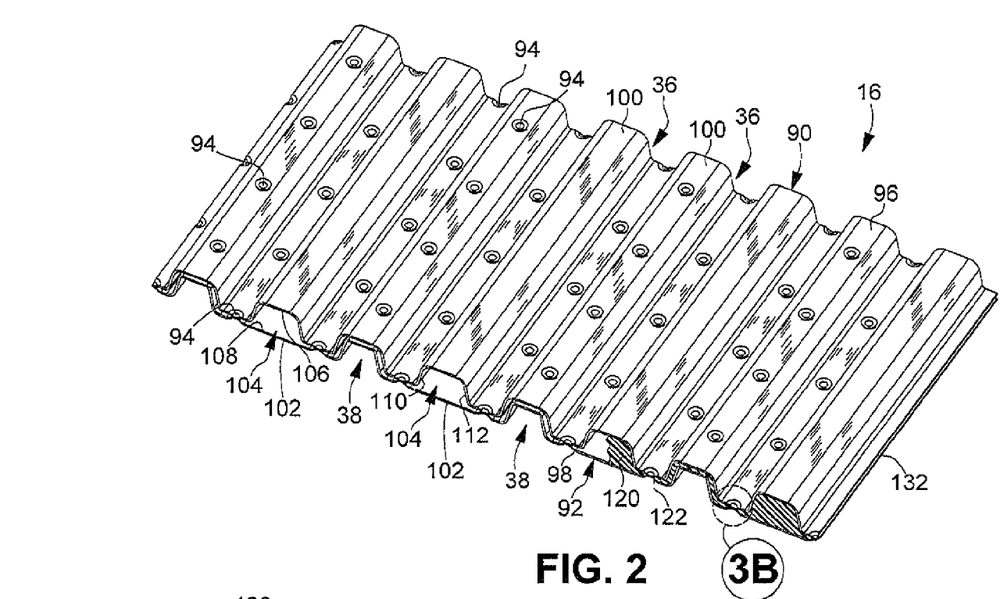
FIG. 2 is a perspective view of a joined bipolar plate assembly according to an embodiment of the present disclosure.

FIG. 2 shows a bipolar plate 16 according to an embodiment of the invention. The bipolar plate 16 is formed from a first unipolar plate 90 and a second unipolar plate 92, joined together by plugs 94. A first active surface 96 of the first unipolar plate 90 corresponds to the working face 32 (FIG. 1), and acts as the cathode side of the bipolar plate 16. A second active surface 98 of the second unipolar plate 92 corresponds to the working face 30 (FIG. 1), and acts as the anode side of the bipolar plate.

The first active surface 96 of the first unipolar (cathode) plate 90 includes a plurality of grooves 36 adapted to distribute the reactant gases across the first active surface 96 of the cathode plate 90. The plurality of grooves 36 define a plurality of lands 100 disposed therebetween. Similarly, the second active surface 98 of the second unipolar (anode) plate 92 includes a plurality of grooves 38 separated by lands 102. The grooves 38 act as reactant flow paths along the lower surface 98 of the anode plate 92. The first unipolar plate 90 and the second unipolar plate 92 cooperate upon assembly into the bipolar plate assembly 16 to form coolant channels 104. The bipolar plate 16 shown is analogous to a stamped plate flow field pattern, whereby the upper wall 106 of the coolant channel 104 is formed by the lands 100 of the cathode plate 90, while the lower wall 108 of the coolant channel 104 is formed by the lands 102 of the anode plate 92. The side walls 110, 112 of the coolant channel 104 are formed by the sides of the grooves 36, 38, as desired. The bipolar plate assembly 16 further includes a plurality of gas ports (not shown) and coolant ports (not shown), to provide inlet and outlet passages for the fuel, the oxidant, and the coolant to flow through the bipolar plate assembly 16. A skilled artisan should understand that various configurations of the grooves 36, 38, the coolant flow channels 104, and the ports in the bipolar plate assembly 16 may be used as desired. However, straight anode, cathode, and coolant flow channels are commonly used, such as those described in commonly owned U.S. Pat. Publ. No. 2007/0275288, hereby incorporated by reference in its entirety. It should also be recognized that the present disclosure is not limited to a particular flow field pattern, but has application to bipolar plate assemblies independent of the flow field pattern.

Figure 3A:
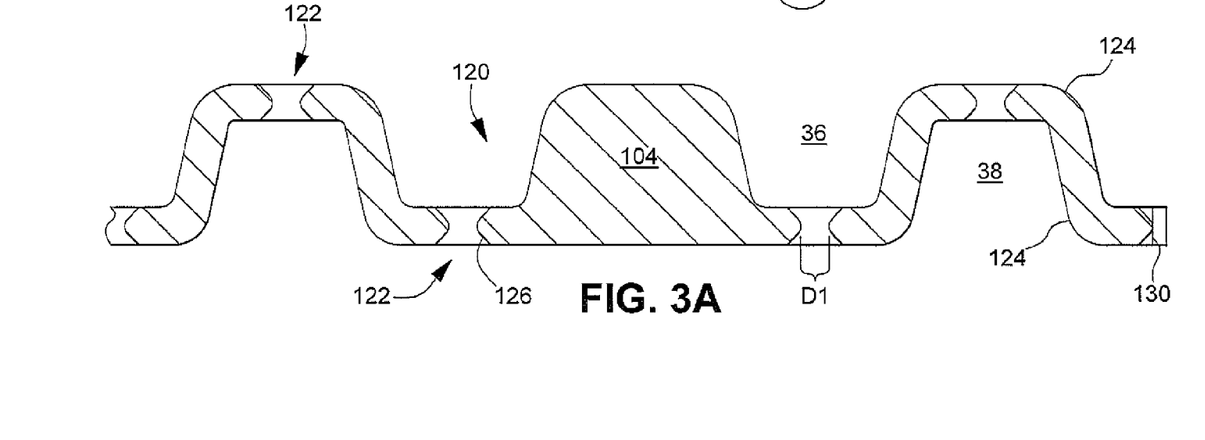
FIG. 3A is a fragmentary cross-sectional elevational view of a substrate used to form a bipolar plate assembly according to the embodiment of the invention shown in FIG. 2.

The first and second unipolar plates 90, 92 are formed from an electrically conductive material deposited in an electroforming process. As shown in FIG. 3A, a mold or substrate 120 is formed of a suitable material that can be removed after the electroforming process. Suitable compositions for the substrate 120 include at least one of a wax, a polymer, or a metal, although other materials may also be used. The substrate 120 is made with surface features corresponding to the grooves 36, 38, and includes solid portions corresponding to the coolant flow paths 104. It is understood that the substrate 120 may also include any other desirable flow field pattern as required in the bipolar plate assembly 16. The substrate 120 is also formed to include a plurality of apertures or vias 122. It is understood that the vias 122 may be circular as shown, or they may be any other desired geometric shape, such as slots. The vias 122 may be formed with chamfered inner surfaces 126 and have a minimum diameter D1.

Figure 3B:
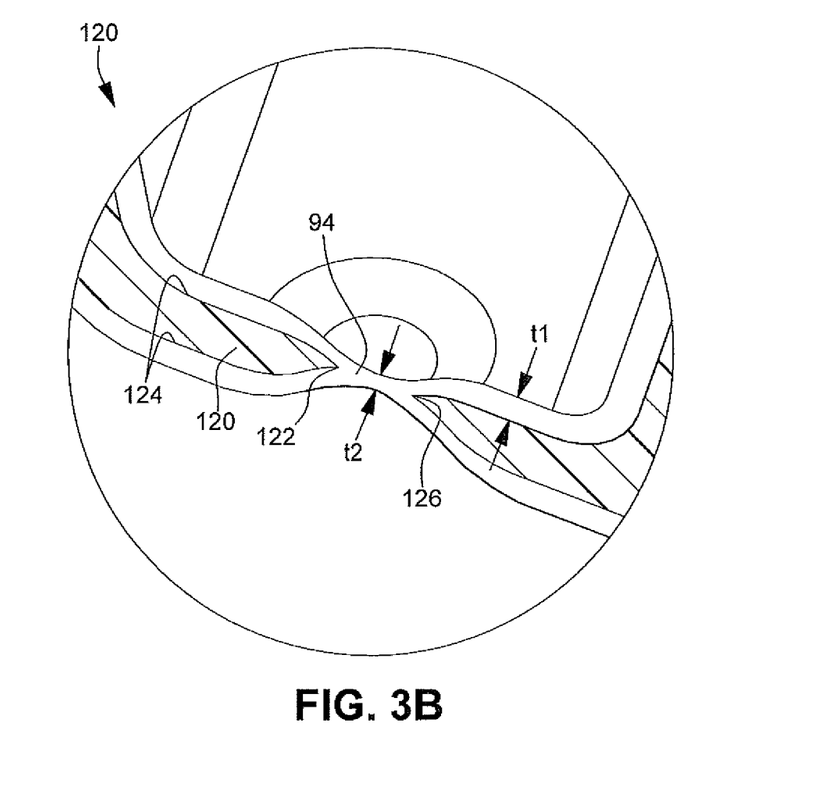
FIG. 3B is a fragmentary perspective view of a portion of the joined bipolar plate assembly depicted by circle 3B of FIG. 2 showing a plug interconnecting the plate assembly.

FIG. 3B shows a portion of the bipolar plate assembly 16 from FIG. 2 to show one of the vias 122 and surrounding areas of the substrate 120 after an electroforming operation. To form the bipolar plate assembly 16, the substrate 120 is placed in a metal plating bath, where a desired plating material is plated on the exterior surface 124 of the substrate 120. The plating material is preselected to include appropriate and desired physical properties, including durability, rigidity, gas permeability, conductivity, density, thermal conductivity, corrosion resistance, definition, thermal and pattern stability, availability and cost. The substrate 120 is allowed to remain in the metal plating bath until a sufficient thickness of plating material is deposited thereon. Favorable results have been found when the plating thickness t1 is between 10 and 50 micrometers. However, it is understood that different thicknesses t1 may be applied as desired.

During the period when the substrate 120 remains in the metal plating bath, plating material also deposits along the inner chamfered surface 126 of the vias 122, The vias 122 are sized such that the vias 122 are completely filled with the plating material during the electroforming process, so that the vias 122 are completely closed to reactant flow by plugs 94, thereby forming a hermetic seal between the unipolar plates 90, 92. The plugs 94 also serve to interconnect the unipolar plates 90, 92, thereby providing both thermal and electrical conductivity therebetween. Favorable results have been found when the diameter D1 of the vias 122 formed in the substrate 120 is approximately twice the desired plating thickness t1 to ensure that the vias 120 are completely filled by the plating material. Favorable results have been found where a thickness t2 of the plugs 94 is between t1 and twice the value of t1 (i.e. $t1 \leq t2 \leq (2 \times t1)$).

Once a sufficient and desirable thickness t1 of plating material has been deposited on the substrate 120, the substrate 120, now including a bipolar plate assembly 16, is removed from the metal plating bath for further processing. In one processing step, the substrate 120 is removed from between the unipolar plates 90, 92 by melting and draining, by oxidation, or by chemical dissolution, as appropriate. Once the substrate 120 is removed, only the bipolar plate assembly 16 remains, including both unipolar plates 90, 92 interconnected by plugs 94. The distribution and number of plugs 94 may be chosen as desired. However, favorable results have been obtained using a substantially even distribution of the plugs 94. Electroforming the bipolar plate assembly 16 on the substrate 120 advantageously allows for design flexibility of the unipolar plates 90, 92 that is not afforded by other manufacturing processes, such as stamping or forming. In particular, the electroforming process allows for deeper grooves 36, 38 and a lower reactant pressure drop across each unipolar plate 90, 92, and avoids metal tearing issues accompanying a metal plate stamping process. Moreover, the electroforming process requires on the order of 10% to 50% (depending on the thickness t1 desired) less plating material than required in a stamped plate process, and eliminates waste material in the peripheral regions of the plate assembly 16.

In one embodiment, the bipolar plate assemblies 16 may be formed as individual and discrete assemblies using separate and individually crafted substrates 120. As discrete assemblies, the plating material may then be allowed to deposit about the perimeter 130 (FIG. 2, FIG. 3A) of the substrate 120 and form perimeter edges 132, thereby hermetically sealing the perimeter of the bipolar plate assembly 16. By allowing the plating material to form the sealed perimeter edges 132 of the bipolar plate assembly 16, the need for a separate perimeter seal between the unipolar plates 90, 92 is eliminated. The perimeter edge 132 may be cut within the coolant headers (not shown) both to facilitate removal of the substrate 120 and to permit a coolant flow path through the bipolar plate assembly 16, which is necessary for proper operation of the fuel cell. However, removal of the substrate 120 may occur from any location as desired.

Alternatively, the bipolar plate assemblies may be formed on a substrate 120 that includes repeating surface patterns of the grooves 36, 38, the solid portions corresponding to the coolant flow paths 104, or any other desirable flow field features, and the vias 122. Repeating and adjacent bipolar plate assemblies 16 would be separated, for example, by a cutting process, after the electroforming process. Once separated, the substrate 120 would be removed by previously mentioned methods. However, the perimeter edges 132 of bipolar plate assemblies formed by a continuous substrate process may require a separate sealing action, such as by crimping, welding, bonding or any other desirable process. In this way, many bipolar plate assemblies 16 may be efficiently manufactured using the electroforming process of the present disclosure.

Figure 4A:
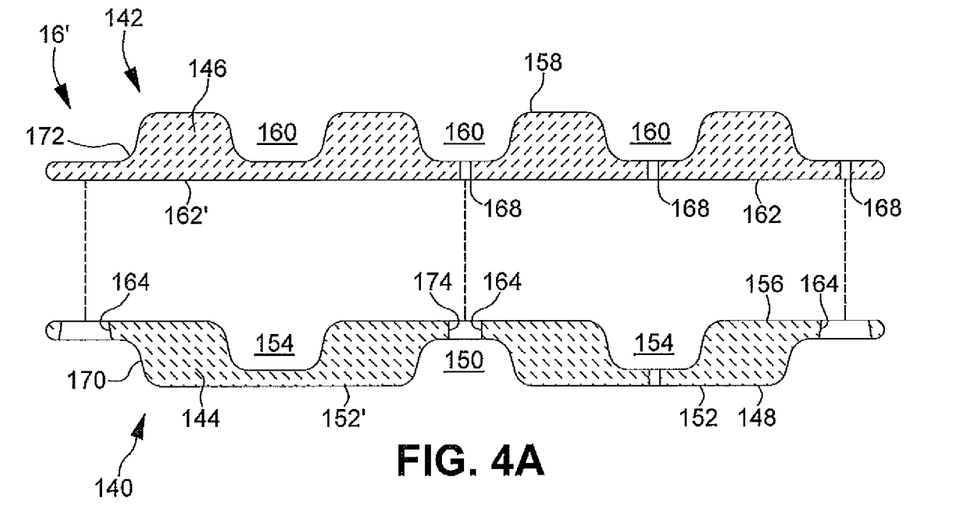
FIG. 4A is an exploded cross-sectional view of substrates used to form a bipolar plate assembly according to another embodiment of the present disclosure.
Figure 4B:
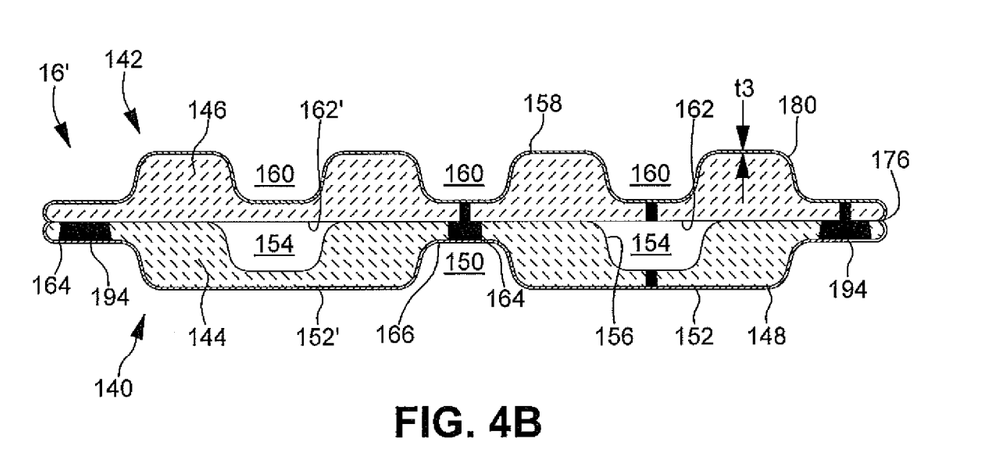
FIG. 4B is an elevational cross-sectional view of a joined bipolar plate assembly according the embodiment of FIG. 4A.

In another embodiment, shown in FIGS. 4A and 4B, a bipolar plate assembly 16' may be formed from two separately formed laminate unipolar assemblies 140, 142 that are subsequently bonded together during the plating process. Each of the unipolar assemblies 140, 142 includes a substrate 144, 146, respectively, formed from a preferred substrate material, such as at least one of a polymer, a composite, or a metal. Favorable results have been obtained by utilizing a polymer having a similar thermal expansion coefficient as the plating material.

Each substrate 144, 146 is prepared having desirable flow field configurations. For purposes of illustration in FIGS. 4A and 4B, the substrate 144 of the unipolar assembly 140 corresponds to an anode plate assembly, while the substrate 146 of the unipolar assembly 142 corresponds to a cathode plate assembly. The flow field pattern of the bipolar plate assembly 16' shown in FIGS. 4A and 4B is analogous to a composite plate flow field pattern, whereby coolant channels are formed in a pattern that is independent of the reactant flow field pattern. In particular, with reference to the anode unipolar plate 140, a first face 148 of the anode substrate 144 includes reactant flow channels 150 that are separated by lands 152. The lands 152 are generally wider than the reactant flow channels 150, thereby allowing formation of coolant channels 154 on a second side 156 of the anode substrate within the lands 152. Moreover, the coolant channels 154 are provided only within the anode second side 156, and are not provided in the cathode unipolar plate 142. Instead, a first side 158 of the cathode substrate 146 includes cathode reactant flow channels 160, while a second side 162 of the cathode substrate 142 is substantially flat.

At least one of the substrates 144, 146 includes joining apertures or vias 164 to facilitate joining of the two substrates together during an electroplating process. Favorable results have been found when the joining vias 164 are located along the bottom wall 166 of the anode reactant flow channels 150, as shown in FIG. 4A, such that when the substrates 144, 146 are abutted, the vias 164 lay adjacent the flat second side 162 of the cathode substrate 144. The vias 164 are shown as circular in cross section, but may have any desired shape, including slots to assist with alignment. Further, depending upon the material used to construct the substrates 144, 146, one or both of the substrates may include additional, smaller sized vias 168 that, once filled with the plating material, allow for electrical conductivity and heat rejection from the plates 140, 142 during operation of the fuel cell. In particular, because of the size of the small sized vias 168, they may be omitted due to improve manufacturability of the bipolar plate assembly 16'. For example, as shown particularly in FIGS. 4A and 4B, the left side lands 152' omit the smaller sized vias 168, while the right side lands 152 include the smaller sized vias 168. Similarly, the left side flat second side 162' is shown without the smaller sized vias 168, while the right side flat second side 162 includes the smaller sized vias 168, Therefore, the substrates 144, 146 include either small vias 168 or joining vias 164 to provide electrical conductivity through the plates 140, 142. Additionally, as previously noted, the joining vias 164 are located adjacent the flat second side 162 of the adjacent substrate 144 to form a bond thereto to militate against coolant leakage from coolant channels 154 through the joining vias 164 in the event that the joining vias 164 are not completely filled by the plating process.

In practice, one of two methods is utilized to construct the bipolar plate assembly 16'. In a first method, the substrates 144, 146 are formed and then are provided with a first layer of plating material in an electroforming process. The first layer of plating material is relatively thin, on the order of 3 to 10 micrometers in thickness, and covers the entire outer surfaces 170, 172 of the substrates 144, 146, respectively, including the inner surface 174 of the joining vias 164. If desired, the first plating process may continue until the smaller vias 168 are filled in with plating material. Once a desired thickness of plating material is deposited, the substrates 144, 146 are abutted and held together, and a second plating operation is performed, wherein the joining vias 164 are entirely filled in with plating material to bond the unipolar plates 140, 142 together with plugs 194. Additionally, the external perimeter 176 of the interface between the unipolar plates 140, 142 may also be bonded together due to the deposition of plating material, thereby sealing the external perimeter 176 against coolant leakage. Favorable results have been found when the second plating operation deposits an additional 3 to 10 micrometers of plating material, such that the entire thickness t3 of plating material 180 deposited on each unipolar plate is between about 5 and 20 micrometers thick. However, it is understood that different thickness of material may be applied.

In a second method, only a single plating operation is utilized. The first and second substrates 144, 146 are prepared as above, and are immediately abutted and held together. The abutted substrates 144, 146 are then subjected to a single plating operation to deposit the entire thickness of plating material 180 to the outer surfaces 170, 172 of the substrates 144, 146. The plating operation continues until the joining vias 164 and the smaller vias 168 are entirely filled with plating material, and the perimeter 176 is bonded together to seal the interface between unipolar plates 140, 142. Favorable results have been found when the larger joining vias 164 of the anode substrate 144 are aligned with and overlap a plurality of the smaller vias 168 formed on the cathode substrate 146 to create both plate-to-plate sealing and through plate conduction and sealing through the plugs 194. As noted above, the final thickness t3 of the plating material 180 is preferably between about 5 and 20 micrometers thick.

Figure 5:
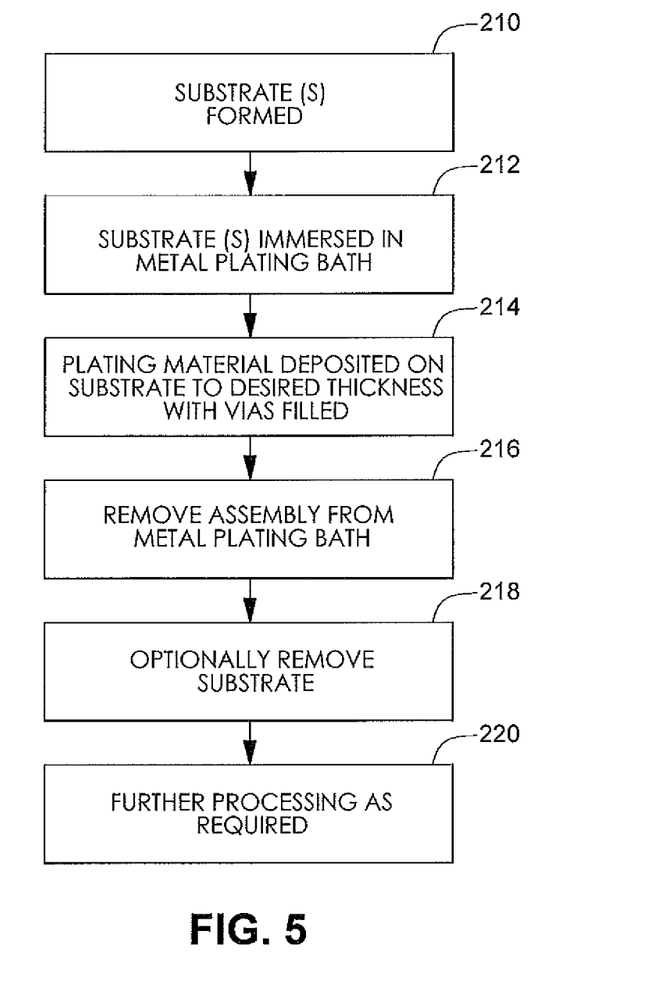
FIG. 5 is a flow chart summarization of the steps for producing a bipolar plate assembly according to the present disclosure.

FIG. 5 summarizes the process steps necessary to form the embodiments of the present disclosure. According to the method, a first step 210 requires formation of at least one substrate having desirable flow field properties. The substrate may be formed from a removable material, or it may be formed of a material having desirable thermal characteristics intended to remain within the bipolar plate assembly. Once formed, the substrate is immersed in a metal plating bath in a second step 212 until a desirable amount of plating material is deposited at 214.

Once a desirable amount of plating material is deposited, the assembly is removed from the bath in a fourth step 216. Depending upon the embodiment, the substrate is optionally removed in a fifth step 218 as previously described by opening apertures within coolant ports or by separating continuous parts. Lastly, a sixth step 220 allows for further processing as required, such as by crimping, welding or bonding the separated plates, for example.

It is surprisingly found that the plurality of electrically and thermally conductive plugs 94, 194 provides a stable, low-electrical resistance pathway between the first unipolar plates 90, 140 and the second unipolar plates 92, 142. One of ordinary skill should appreciate that such a pathway is now provided with an optimized quantity of material used to respectively bond the unipolar plates 90, 92 and 140, 142 together. The methods of the disclosure may also be more rapidly performed in comparison to conventional processes for preparing fully-bonded bipolar plate assemblies, and utilize significantly less material than conventional forming processes. As well, a large amount of waste material is eliminated, while the complex flow field patterns on the unipolar plates may be repetitively manufactured. Finally, extremely thin unipolar plate assemblies may be manufactured, at reduced costs over conventional plates, which minimize the overall size and cost of a fuel cell assembly.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for producing a bipolar plate assembly for a fuel cell stack, the method comprising the steps of:
   providing a first substrate and a second substrate, each of the first substrate and the second substrate having an external surface corresponding to a desired flow field pattern, at least one of the first substrate and the second substrate including at least one via formed therein;
   immersing the first substrate and the second substrate in a plating bath;
   plating a first predetermined thickness of a plating material on the external surfaces of the first substrate and the second substrate;
   abutting the first substrate with the second substrate;
   plating a second predetermined thickness of a plating material on the external surfaces of the first substrate and the second substrate over at least a portion of the first predetermined thickness, the at least one via filled by the plating material when the second predetermined thickness is achieved to bond the first substrate and the second substrate, an external perimeter between the first substrate and the second substrate joined by the second predetermined thickness of plating material to provide a hermetic seal therebetween; and
   withdrawing the first substrate and the second substrate from the plating bath.

2. The method of claim 1, wherein the first predetermined thickness is between about 3 and 10 micrometers.

3. The method of claim 2, wherein the second predetermined thickness is between about 3 and 10 micrometers.

* * * * *